United States Patent Office 3,189,479
Patented June 15, 1965

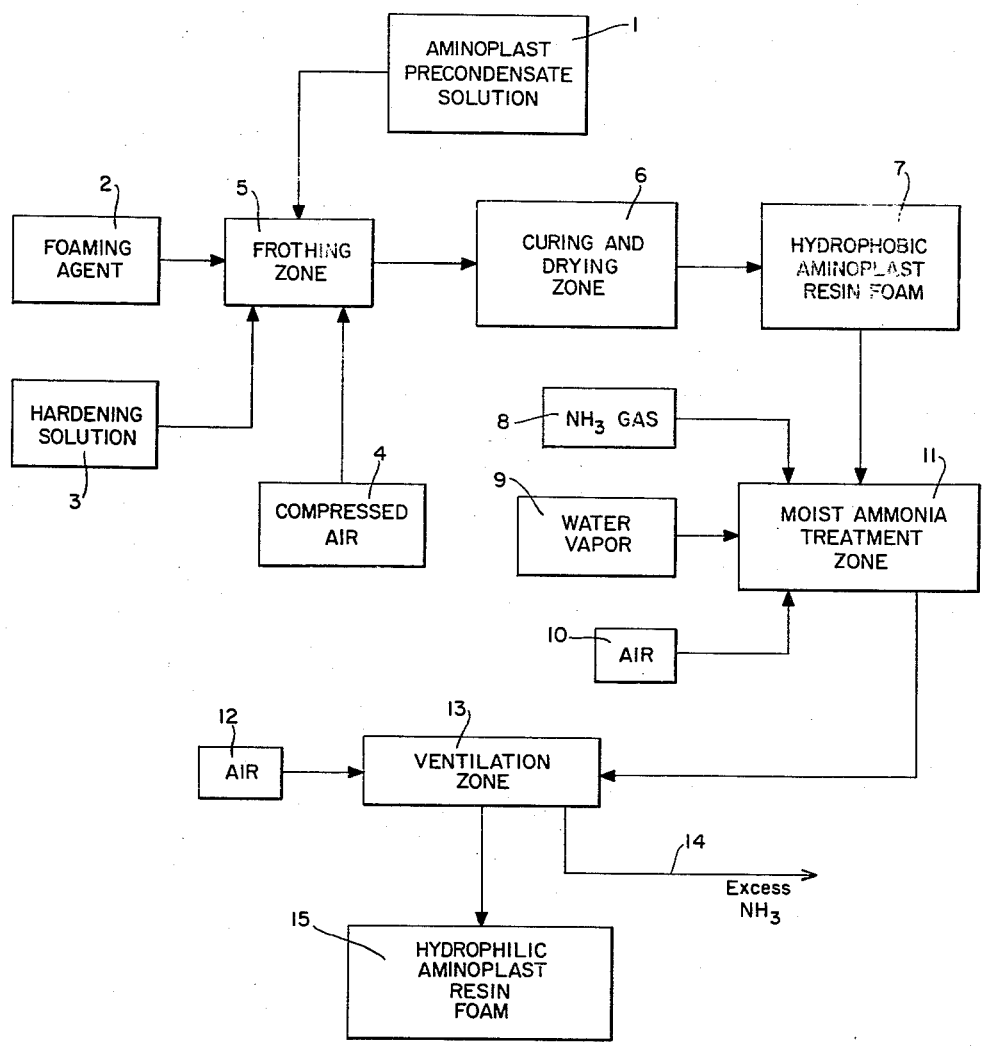
PREPARATION OF HYDROPHILIC AMINOPLAST RESIN FOAM
INVENTORS.
SYDNEY COPPICK
RONALD L. BEAL

3,189,479
MODIFIED RESIN FOAMS AND PROCESS OF MANUFACTURE THEREOF
Sydney Coppick, Ridley Park, and Ronald L. Beal, Lansdowne, Pa., assignors to Scott Paper Company, Philadelphia, Pa., a corporation of Pennsylvania
Filed Oct. 4, 1961, Ser. No. 142,777
8 Claims. (Cl. 117—98)

The present invention relates to aminoplast resin foams and more particularly to the modification of such foams to impart thereto an unusual affinity for water.

Cellulated aminoplast resins have been known for some time and they are enjoying a growing utilization as fillers, protective cushioning and insulating materials. The value of the resin foams for such applications has been enhanced by specialized curing techniques, heat and work treatments whereby to improve the tensile strength and resistance to physical deterioration of the foams. In some fields, however, as for example the paper and board industry where material hydrophilicity is important, the pronounced hydrophobic character of most cellulated aminoplast resins has seriously limited their application.

It is, accordingly, a primary object of our invention so to modify an aminoplast resin foam that it will be accorded improved water absorption properties.

Other objects and advantages of our invention will become apparent from the following detailed description of certain preferred embodiments thereof.

An illustrative embodiment of the process of this invention is shown in the accompanying drawing in which the figure is a flow chart showing the preparation of hydrophilic aminoplast resin foam. The solution of the aminoplast precondensate 1 together with the foaming agent 2, the catalyst hardening solution 3, and compressed air 4 enter the frothing zone 5. The resulting fine-textured foam is cured and dried in zone 6 to produce a hydrophobic aminoplast resin foam 7. This foam in turn is subjected to the action of ammonia gas 8 and water vapor 9 in the presence of air 10 in the moist ammonia treatment zone 11 and flushed with fresh air 12 in the ventilating zone 13 to remove the excess ammonia 14 and produce a hydrophilic aminoplast resin foam 15.

Aminoplast resin foams may be produced by aeration of an aqueous solution of a urea-formaldehyde prepolymer to which has been added a sulfonated wetting or dispersing agent and an acid catalyst or hardening agent to create a foam which is subsequently cured. Such urea-formaldehyde resin foams can be produced with a specific gravity varying from about 0.01 to about 0.5 or a density of from 0.2 to 1.5 pounds per cubic foot by careful control of the degree of condensation of the resinous prepolymer.

Additionally, it has been noted that the degree of aeration and matrix agitation affects the fineness of the ultimate foam which may have as many as $10^5$ cells per cubic centimeter. Upon curing in a moist atmosphere there results a reticulated structure whose skeletal configuration is composed of rod-like strands arranged in a three-dimensional network resembling in many respects the more conventional spongeform bodies. Melamine-formaldehyde resins, mixed melamine-urea-thiourea condensation products with formaldehyde and phenol-formaldehyde resins may be similarly processed to produce lightweight foams. Other foamed resins are disclosed in U.S. Patents Nos. 2,273,367, 2,384,387, 2,559,891 and 2,813,780; Belgian Patents Nos. 527,694, 565,130 and 569,190; Italian Patent No. 590,887 and Australian Patent No. 206,116.

The foamed resins, described above, as normally prepared are strongly hydrophobic and resist penetration by water but by suitable exposure thereof to ammonia will be changed into hydrophilic structures enabling their utilization in areas where such characteristic is essential.

The following examples will better illustrate the nature of our invention; however, the invention is not intended to be limited to these examples. Parts are by weight unless otherwise indicated.

EXAMPLE I

A labile aminoplast pre-resin was prepared as follows: 1,200 parts of urea, 1,165 parts of paraformaldehyde, 2,206 parts of water, 190 parts of methanol, 104 parts of Urotropin (hexamethylene tetramine) and 10 parts of 4 molar sodium hydroxide solution were placed in a reaction flask equipped with a reflux condenser, a thermometer and a mechanical stirrer. The flask was heated under agitation to reflux temperature of about 98° C. and retained under reflux for 15 minutes. Then 40 parts of 10% sodium hydroxide solution were added to stop the reaction. The product had a viscosity of 55 centistokes at 20° C.

To 52 parts of this intermediate resinous product there was added 1 part of urea, 5 parts of 34% Teepol 610 (a sodium secondary alkyl sulfate produced by Shell Chemical Corporation) and 42 parts of water, to provide a solution which was blended with an acid hardening catalyst composed of 7.5 parts of 85% phosphoric acid, 2.0 parts of urea and 90 parts of water in a foaming nozzle in the proportion of 2 volumes of resin to 1 volume of hardener. Compressed air was admitted to the mixture which proceeded at high velocities over a tortuous path containing obstacles to generate a fine foam which was collected in wire mesh containers and placed in a curing oven, with air circulation rate of 1000 cubic feet per minute, for three hours at a temperature of 85° C. and 42% relative humidity. The moist, cured, reticulated three-dimensional strand structure so obtained was dried in the same oven at 5% relative humidity and 60° C. for an additional period of four hours. The ultimate product possessed a density of 0.5 pound per cubic foot.

Blocks (5″ x 3″ x ½″) of the foamed structure were exposed at 30° C. to gaseous ammonia for various periods of time. They were then removed and tested immediately for the rate of absorption of 1 cc. of water on the surface of the block. The following results were obtained:

*Table I*

WATER ABSORBENCY OF AMMONIA TREATED UREA-FORMALDEHYDE FOAM

| Time of Treatment with $NH_3$ Gas (Minutes) | Absorbency (Seconds) |
| --- | --- |
| 0 (Control—no treatment) | Greater than 5,000. |
| 5 | 4. |
| 10 | Less than 0.1. |
| 15 | Less than 0.1. |

During exposure of blocks of the reticulated urea-formaldehyde strand structure to an atmosphere containing ammonia gas, the gas penetrates the block and occupies in whole or in part that continuous phase previously occupied by air alone, with the result that after treatment, an excess of NH$_3$ is present within the strand structure. We have discovered that these slabs retain their hydrophilic character induced by the NH$_3$ treatment even after this excess gas has been removed.

Sections of urea-formaldehyde foam 1″ in thickness prepared as hereinbefore described were exposed in a confined chamber to the vapors emanating from a 28% ammonium hydroxide solution at 25° C. for a period of two hours. The sections were then removed from the ammonia atmosphere and so positioned in a current of rapidly moving air from a household fan that the air passed through the porous slab. The ventilated foam had no detectable odor of ammonia and when tested for the rate of absorbency of a 1 cc. portion of water, the following results were obtained, where both sides of the sections were tested:

*Table II*

WATER ABSORBENCY OF AMMONIA TREATED AND VENTILATED UREA-FORMALDEHYDE FOAM

| Ventilation Time (hours after treatment) | Absorbency (Seconds) |
|---|---|
| 0 (immediately after treatment) | Top side—0. Bottom side—0. |
| 0.5 | Top side—1. Bottom side—10. |
| 1.0 | Top side—0. Bottom side—3. |
| Original slab untreated | Top side—greater than 5,000. Bottom side—greater than 5,000. |

EXAMPLE II

A moist, cured, reticulated strand structure was prepared as in Example I. This was dried in a circulating air oven at 65° C. for eight hours. Slabs ¼ inch thick were cut from these blocks and treated at 50° C. to the vapors from 28% ammonium hydroxide for a period of 30 minutes. The treated slabs were ventilated in a chamber through which a rapid current of fresh air was passed for a period of 15 minutes. The ventilated slabs were then cut to small pads 1″ x ½″ x ¼″. These pads were adhered by means of a pressure sensitive adhesive to a backing tape, with an intermediate layer of reinforcement webbing in the assembly, if desired, to produce surgical dressings. When superposed over flesh wounds, lacerations or abrasions, fluid discharges were quickly and completely absorbed. Furthermore the foam lamina of the bandages exhibited no tendency to adhere to the exposed tissues with which they were in contact.

EXAMPLE III

A spray-dried urea-formaldehyde condensate as described in U.S. Patent No. 2,858,195 was converted into a foam structure in accordance with the teachings of Belgian Patent No. 565,130 and cured by heating in the presence of a hardening agent for 3 hours at 100° C. and approximately 75% relative humidity. Sections of the cured foam were immersed in a 10% solution of NH$_4$OH at room temperature for 5 minutes and worked to effect complete impregnation thereof. The sections were thereafter removed from the ammonia solution, dried and tested as in the preceding examples for the rate of absorption of 1 cc. of water on the surface. The cured foam prior to treatment with the ammonia solution did not imbibe the water whereas the treated section absorbed the applied water almost immediately.

EXAMPLE IV

Moist blocks of a reticulated foamed structure were prepared in the manner of Example III. These were dried in a circulating air oven at 8% relative humidity and a temperature of 65° C. for a period of three hours, with air flowing at the rate of 1000 cubic feet per minute. At the end of the drying period, a stream of moist ammonia gas was introduced into the suction side of the air recirculation fan. The moist ammonia gas was obtained by injecting steam into a concentrated solution (28%) of ammonium hydroxide. The ammonia treatment was continued for a period of 20 minutes with the oven temperature maintained at 65° C. The ammonia injection was then shut off, and the oven was ventilated with fresh air for a further period of 30 minutes. During this period the recirculation system was closed, and all exit gases were exhausted to the atmosphere.

The treated blocks of foam were disintegrated in a Hydrapulper at 3% consistency where they broke up very readily. Normally, considerable difficulty is encountered in this operation with untreated blocks where non-wetting and flotation cause cavitation of the impeller and non-uniform disintegration results.

The homogeneously disintegrated slurry was pumped to a dewatering tray and washed thoroughly with water. The cake was finally displacement washed to replace the residual water with a lanolin emulsion. The creamy product was used as a cosmetic base.

EXAMPLE V

A foamed melamine-formaldehyde resin was subjected to gaseous ammonia at a temperature of 40° C. for a period of one hour. The treated foam was broken up in a fiberizing disc mill with an excess of water and formed a slurry of about 3% consistency which was readily blended with wood fibers to provide a paper stock.

Foams treated in accordance with the present invention are quite bibulous and may be employed as the inner filler for sanitary napkins or catamenial pads. In another application a thin lamina of treated foam may be covered with creped paper stock, a starch adhesive serving as a binder for the several elements to produce a mat having high liquid absorbency, thermal insulating characteristics and good cushioning properties.

What we claim is:

1. A process of imparting hydrophilicity to a foamed, cured and hardened aminoplast resin structure which comprises contacting the surfaces of said foam structure with ammonia.

2. A process of imparting hydrophilicity to a foamed, cured and hardened aminoplast resin structure which comprises exposing the surfaces of said foam structure to gaseous ammonia.

3. A process of imparting hydrophilicity to a foamed, cured and hardened urea formaldehyde resin structure which comprises exposing the surfaces of said foam structure to gaseous ammonia.

4. A process of imparting hydrophilicity to a foamed, cured and hardened urea formaldehyde resin structure which comprises exposing the surfaces of said foam structure to moist gaseous ammonia.

5. The process of claim 4 in which the exposure is effected at a temperature between 20° and 65° C. from about 5 minutes to about two hours.

6. A process of imparting hydrophilicity to a foamed, cured and hardened aminoplast resin structure comprising the steps of introducing said foamed, cured and hardened resin into a treating zone wherein said foam structure is kept exposed to ammonia, water vapor and air from about 5 minutes to about 2 hours at a temperature between about 20° C. and about 65° C., removing the treated resin structure from the treating zone and introducing it into a ventilation zone and keeping the structure in said ventilation zone in presence of circulating air for a time sufficient to remove excess ammonia and thereafter removing the hydrophilic aminoplast resin structure from said ventilation zone.

7. A hydrophilic foamed, cured and hardened aminoplast resin structure prepared according to the process of claim 1.

8. A hydrophilic foamed, cured and hardened aminoplast resin structure prepared according to the process of claim 4.

References Cited by the Examiner
UNITED STATES PATENTS

| | | | |
|---|---|---|---|
| 2,429,698 | 10/47 | Schneider | 117—106 |
| 2,753,277 | 7/56 | Smithers | 117—38.8 |
| 2,983,623 | 5/61 | Coates | 117—106 XR |

WILLIAM D. MARTIN, *Primary Examiner.*

RICHARD D. NEVIUS, *Examiner.*